United States Patent
Nielsen et al.

(10) Patent No.: US 9,638,817 B2
(45) Date of Patent: May 2, 2017

(54) BUOY FOR MARINE SURVEYS

(75) Inventors: Einar Nielsen, Bekkestua (NO); Karl Petter Elvestad, Trogstad (NO)

(73) Assignee: PGS Geophysical AS, Oslo (NO)

( * ) Notice: Subject to any disclaimer, the term of this patent is extended or adjusted under 35 U.S.C. 154(b) by 1542 days.

(21) Appl. No.: 13/095,395

(22) Filed: Apr. 27, 2011

(65) Prior Publication Data

US 2012/0275265 A1    Nov. 1, 2012

(51) Int. Cl.
*B63B 51/04* (2006.01)
*G01V 1/38* (2006.01)
*B63B 27/14* (2006.01)

(52) U.S. Cl.
CPC .......... *G01V 1/3817* (2013.01); *B63B 27/146* (2013.01)

(58) Field of Classification Search
CPC ... B63B 35/4413; B63B 51/04; B63B 27/146; G09F 21/18; G01V 1/3817
USPC .... 29/888; 114/61.12, 61.14, 163, 246, 253, 114/264, 277; 415/204; 440/88 C, 88 R; 441/1, 6, 11, 45, 78, 21; 367/4, 20
See application file for complete search history.

(56) References Cited

U.S. PATENT DOCUMENTS

| | | | | |
|---|---|---|---|---|
| 2,790,186 A | * | 4/1957 | Carapellotti | 441/21 |
| 3,623,444 A | * | 11/1971 | Lang | 114/277 |
| 4,069,788 A | * | 1/1978 | Nitzki | 440/88 R |
| 4,119,052 A | * | 10/1978 | Rinaldi | 114/264 |
| 4,890,568 A | * | 1/1990 | Dolengowski | 114/246 |
| 5,616,059 A | * | 4/1997 | Solomon | 441/11 |
| 6,230,645 B1 | * | 5/2001 | Chow | 114/264 |
| 6,588,352 B2 | * | 7/2003 | Kay | 114/61.12 |
| 2012/0076648 A1 | * | 3/2012 | McBride et al. | 415/204 |

* cited by examiner

*Primary Examiner* — Daniel L Murphy (57) ABSTRACT

Buoy for marine surveys. At least some of the illustrated embodiments are a buoy including an elongated main body and a mast system coupled to the elongated main body. The mast system includes: a forward mast; an aft mast; a spanning portion coupled between a distal end of the forward mast and a distal end of the aft mast; and an aperture defined at least in part by the main body, forward mast, aft mast, and spanning portion. The buoy is configured to float in water such that the water level intersects the forward mast and aft mast, the elongated body is submerged, and the spanning portion resides above the water level.

20 Claims, 6 Drawing Sheets

BUOY FOR MARINE SURVEYS

BACKGROUND

Marine survey systems are used to acquire data (e.g., seismic, electromagnetic) regarding Earth formations below a body of water such as a lake or ocean. The marine survey systems comprise a complex array of buoys, lines, and paravane systems in order to properly orient streamers towed behind the survey vessel.

Weather and related sea conditions may adversely affect the ability to perform a marine survey. In adverse weather conditions, the surface waves may induce noise in the signals detected by the underwater streamers by way of the surface buoys associated with the streamers.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Chord" shall mean an imaginary straight line joining a trailing edge and a leading edge of a fin, stabilizer, or mast.

"Cable" shall mean a flexible, load carrying member that also comprises electrical conducts and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to a tail buoy for streamers towed behind a survey vessel during a marine survey. More particularly, the various embodiments are directed to a buoy where the main body is submerged during operation, thus reducing the amount of movement of the buoy caused by surface chop. In various embodiments the buoy has a mast system that extends above the water level that provides location information (both visually and in some cases electronically), and also reduces the chances of the buoy catching or snagging surface debris and/or other survey equipment. The specification first turns to an illustrative marine survey system, and then discusses tail buoys in accordance with various embodiments.

Figure 1:
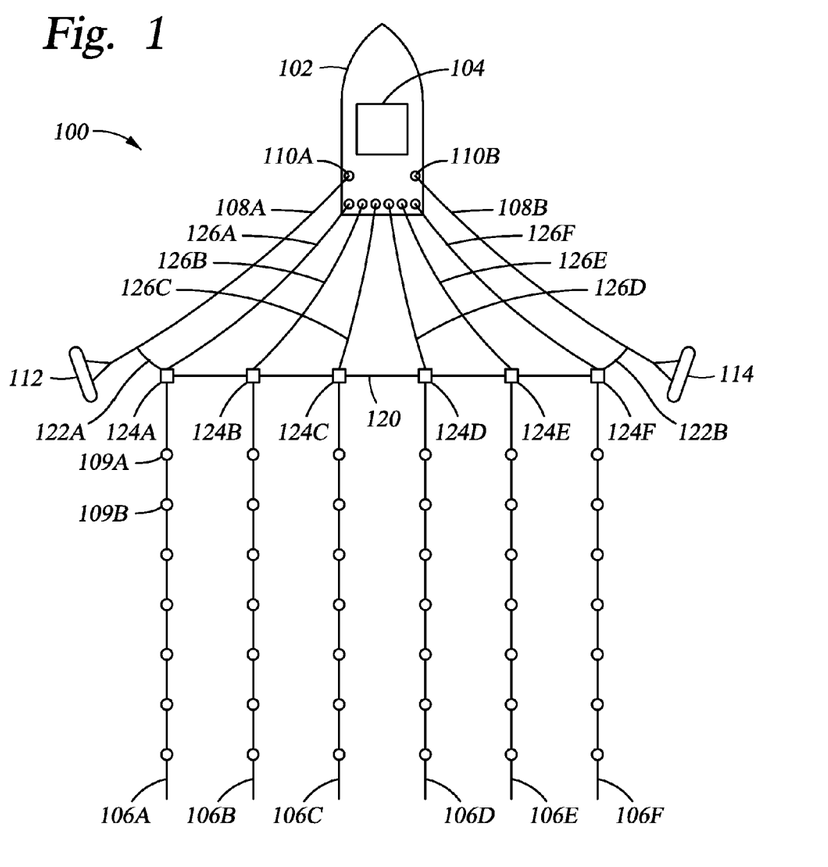
FIG. 1 shows an overhead view of a marine survey system in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six streamers 106, any number of streamers 106 may be equivalently used.

The streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The streamers 106 are each coupled, at the ends nearest the vessel 102, to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 109A, 109B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

Figure 2:
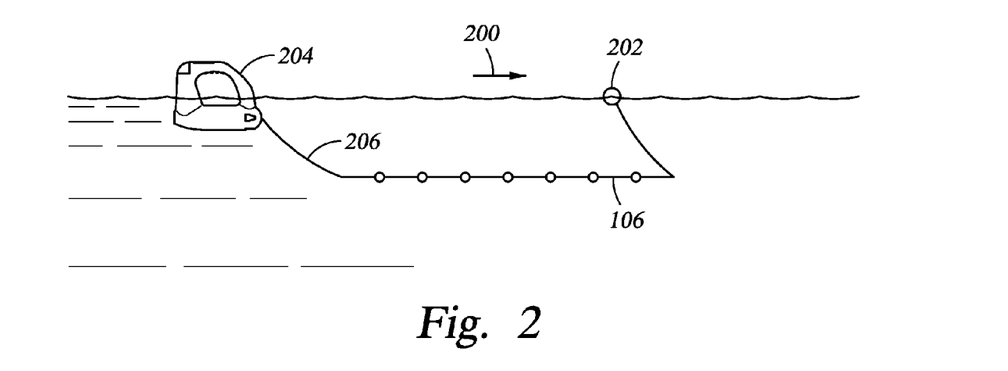
FIG. 2 shows an elevation view of a marine streamer comprising a tail buoy in accordance with at least some embodiments.

Although not shown in FIG. 1, each streamer 106A-F may be associated with one or more buoys. FIG. 2 shows an elevation side view of a streamer 106 in an operational configuration. In particular, FIG. 2 shows a streamer 106 being towed in a direction indicated by arrow 200. In some embodiments, the forward portion of the streamer may be associated with a lead buoy 202, where lead buoy 202 may help maintain the depth of the streamer 106 and/or associated portion of the spreader line 120; however, in other cases the lead buoy 202 may be omitted, or other buoys (e.g., buoys associated with the spreader line 120 (not shown in FIG. 2) may perform similar functions.

FIG. 2 also illustrates a tail buoy 204. Tail buoy 204 may couple to the streamer 106 by any suitable mechanism, such as line 206. Tail buoy 204 may serve several purposes. For example, tail buoy 204 may serve as a visual indication of the location of the end of the streamer 106. In some cases, the tail buoy 204 may likewise provide at least some buoyant force to the streamer 106. In particular, the streamer 106 may be configured to be neutrally buoyant, or perhaps very slightly negatively buoyant. Thus, tail buoy 206 may help maintain the depth of the streamer 106.

However, being mechanically coupled to the streamer 106, the tail buoy 204 may impart unwanted motion to the streamer 106, particularly in choppy seas. Such unwanted motion may result in noise in the signals detected by the sensors of the streamers. In order to reduce the amount of motion in the streamer 106 induced by the tail buoy 204, in accordance with the various embodiments the tail buoy 204 may be configured to operate in a partially submerged orientation. Operating the tail buoy partially submerged may expose the buoy to less surface chop.

Figure 3:
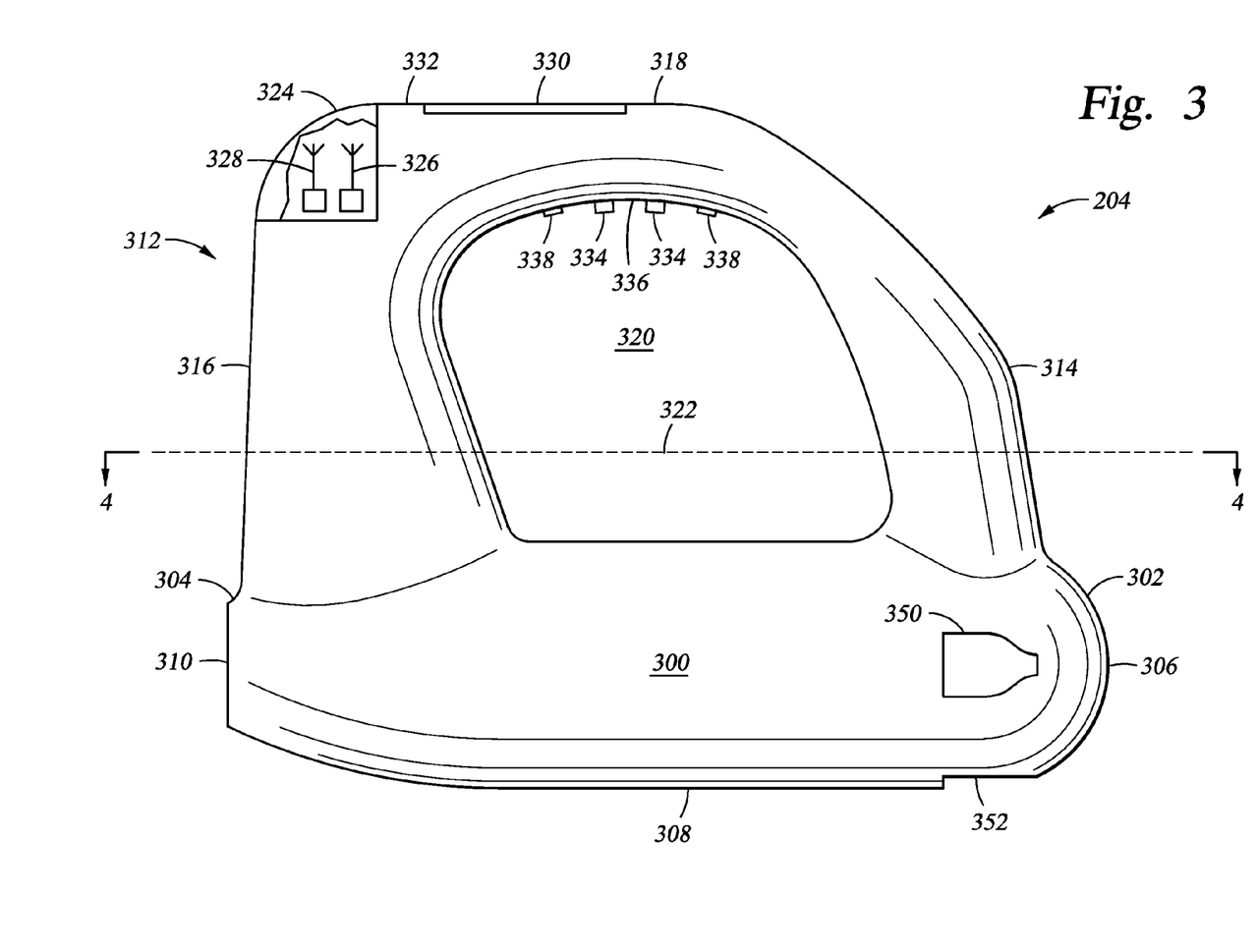
FIG. 3 shows a side elevation view of buoy in accordance with at least some embodiments.

FIG. 3 shows a side elevation view of a tail buoy 204 in accordance with at least some embodiments. In particular, the tail buoy 204 comprises an elongated main body 300. The elongated main body 300 defines a forward portion 302 and an aft portion 304. The forward portion 302 and aft portion 304 are defined in terms of the expected direction of travel of the tail buoy 204 in marine survey use. In a particular embodiment, the length of the elongated main body 300 is about 2.42 meters, and defines a circular cross-section having a diameter of about 0.700 meters at the thickest portion.

In some embodiments, and as illustrated, the elongated main body 300 has a profile at the forward portion 302 that is substantially a parabolic shape. In other embodiments, any suitable shape for the forward portion 302 may be used, such as a conic profile. In a particular embodiment, the tail buoy 204 couples to the streamer 106 (not shown in FIG. 3) by way of a tow point defined within the parabolic forward portion, such as location 306. Other tow points may be used, such as tow points lower on the parabolic shape, or tow points on the bottom side 308 of the elongated main body 300.

In some embodiments, and as illustrated, the elongated main body 300 also has a profile at the aft portion 304 that tapers toward the aft. In some cases, the taper terminates in an aperture 310 out which water flows during use, as discussed more below. In other embodiments, any suitable shape for the aft portion 304 may be used, such as a parabolic profile.

Still referring to FIG. 3, a tail buoy in accordance with the various embodiments further comprises a mast system 312. The illustrative mast system 312 comprises a forward mast 314, aft mast 316, and a spanning portion 318. The forward mast 314 couples to the elongated main body 300 proximate to the forward portion 302. Likewise the aft mast 316 couples to the elongated main body 300 proximate to the aft portion 304. The spanning portion 318 couples between the forward mast 314 and aft mast 316 at the respective distal ends of the masts. In a particular embodiment, and as illustrated, the forward mast 314, aft mast 316, and spanning portion 318 are an integrated component such that the precise transition between the mast portions and the spanning portion are not distinct; however, in other embodiments the forward mast 314, aft mast 316 and spanning portion 318 may be distinct elements coupled together in any suitable fashion.

The elongated main body 300 and mast system 312 define an aperture 320. In accordance with the various embodiments, buoyancy of the elongated main body 300, and in some cases portions of the mast system 312, is designed and/or controlled such that the water level with respect to the buoy 204 in operation intersects the forward mast 314 and aft mast 316, the elongated main body 300 is submerged, and the spanning portion 318 resides above the water level. An example water level is shown in FIG. 3 by way of dashed line 322.

Still referring to FIG. 3, the arrangement of the partially submerged tail buoy enables certain beneficial operational aspects (not all of which may be present in every system). For example, by having the elongated main body 300 submerged below the water level 322, the buoy is less affected by surface chop than buoys whose main body floats at the surface. Because the elongated main body 300 is exposed to less surface chop, correspondingly less motion may be imparted to the streamer 106 (not shown in FIG. 3) to which the tail buoy 204 may be coupled. Next, the aft mast 316 may provide, in some cases, directional stabilization of the tail buoy 204. Stated otherwise, the aft mast 316 may act as a rudder that limits or dampens yaw of the tail buoy 204, thus providing better directional stability. Further still, the forward mast 314 and spanning portion 318 may act to reduce the likelihood of the tail buoy 204 snaring or snagging other objects. For example, in the illustrative embodiments of FIG. 3 surface debris and/or objects (e.g., lines, streamers) will tend to slide over the mast system 312 without catching. In cases where the surface debris and/or other objects are large, the buoy may tilt momentarily to enable the debris and/or other objects to pass over the buoy. In some cases the tilting action may fully or partially submerge the mast portion 312, but such momentary tilting shall not be considered to change the steady state operation where the water level intersects the masts 314 and 316. Stated otherwise, at least the forward mast 314, and possibly both the forward mast 314 and spanning portion 318, may act to deflect objects to reduce the likelihood of catching or snaring such objects.

The mast system 312 may further comprise a variety of systems useful for conducting marine surveys. For example, the mast system 312 may comprise an electrical enclosure 324. As illustrated, the electrical enclosure 324 may have an exterior surface that is conformal to the mast system 312. Such a conformal exterior surface thus also reduces the chances of the tail buoy 204 catching or snaring surface debris and/or other objects. Any of a variety of electrical systems may be fully or partially disposed within the electrical enclosure 324. For example, in a particular embodiment a global positioning system (GPS) antenna 326 may be located in operational relationship to the electrical enclosure 324. As illustrated by the partial cut-away of the electrical enclosure 324, the GPS antenna resides fully within the electrical enclosure 324, but in other cases the antenna 327 may be surface mounted on the electrical enclosure, and/or extend outward from the electrical enclosure 324. The GPS signals received by the GPS antenna 326 and accompanying GPS equipment may enable the tail buoy 204 to determine and/or track its location. In one embodiment, the GPS system associated with the GPS antenna may also reside with the electrical enclosure 324, and in another embodiment the GPS system may reside at any suitable location, such as within a compartment disposed within the elongated main body 300.

Another illustrative system that may be fully or partially disposed within the electrical enclosure 324 is a surface communication system. For example, in a particular embodiment a communication antenna 328 may be located in operational relationship to the electrical enclosure 324. As illustrated by the partial cut away of the electrical enclosure 324, the communication antenna 328 resides fully within the electrical enclosure 324, but in other cases the antenna 328 may be surface mounted on the electrical enclosure, and/or extend outward from the electrical enclosure 324. The communication signals received by the communications antenna 328 and accompanying communication equipment may enable the tail buoy 204 to communicate with any suitable vessel, such as the tow vessel. Such communication may enable, for example, the tow vessel to receive position reports, and well as receive diagnostic information on the electrical and electromechanical systems of the tail buoy.

In a particular embodiment, one or more solar panels 330 may be disposed on an upper surface 332 of the mast system 312, and as illustrated on the spanning portion 318. However, the one or more solar panels 330 may be placed at any suitable location on the mast system 312, including the masts. The illustrated solar panel 330 collects solar energy for use by electrical equipment of the tail buoy 204, such as powering the GPS system (if present), powering the communication system (if present), powering lights (discussed more below, and if present), and/or charging a battery system which then provides power to other systems associated with the buoy. The batteries may be located at any suitable location, such as in the electrical enclosure 324, or in a water tight compartment within the elongated main body 300.

Still referring to FIG. 3, a tail buoy in accordance with some embodiments further comprises one or more lights 334. While the lights may be placed at any suitable location, in a particular embodiment the lights 334 are disposed within the aperture 320, and more particularly on a bottom side 336 of the spanning portion 318. The lights may take a variety of forms, such as individual or grouped light emitting diodes, individual or grouped incandescent bulbs, and/or a high intensity flashing bulb systems. In a particular embodiment, the lights 334 may be combined with a fluorescent material 338, such that the mast system 312 will tend to "glow" for periods of time between operation (e.g., between flashes) of the lights 334. The lights 334 may serve any suitable purpose, and in some cases serve to indicate the location of the tail buoy 204 during nighttime operation.

FIG. 3 also illustrates that tail buoys constructed in accordance with at least some embodiments implement one or more water paths through the elongated main body 300. In particular, FIG. 3 illustrates an inlet or scoop 350, sometimes referred to as a National Advisory Committee for Aeronauts scoop (NACA Scoop). Illustrative scoop 350 is disposed proximate to the forward portion 302 of the tail buoy 204, and though not illustrated in FIG. 3 the scoop 350 is fluidly coupled to an internal fluid channel of the elongated main body. Water flow through the internal channel of the elongated main body may exit by way of outlet aperture 310. In the view of FIG. 3, only scoop 350 is fully visible; however, tail buoys in accordance with the various embodiments may implement a plurality of scoops (e.g., three scoops). In FIG. 3, a portion of a scoop 352 is visible, which scoop 352 is disposed proximate the forward portion 302 opposite the forward mast 314. Positioning of the scoops will be discussed more below.

Figure 4:
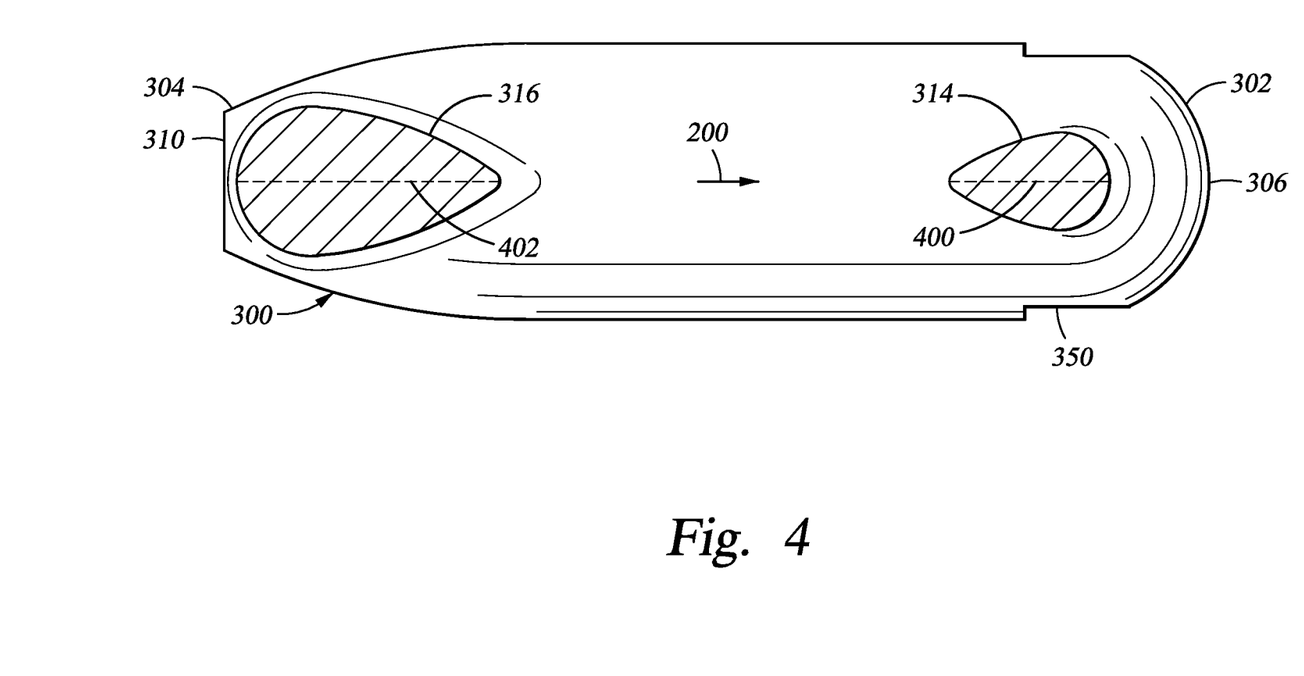
FIG. 4 shows a cross-sectional view of the buoy of taken substantially along line 4-4 of FIG. 3, and in accordance with at least some embodiments.

FIG. 4 shows a cross-sectional view of the masts taken substantially along line 322 (i.e., expected steady state water level) of FIG. 3, and FIG. 4 also illustrates the expected direction of travel of the tail buoy by way of arrow 200. Although the masts may take any suitable form, in accordance with at least some embodiments, and as illustrated, the portions of the masts that are most likely to be intersected by the water level each have the cross-sectional shape of a symmetric air foil. In particular, the forward mast 314 defines chord 400. The forward mast 314 in the illustrated embodiments has a cross-section of a symmetric air foil, with the symmetry being about the chord 400. For the forward mast 314, the leading edge of the mast 314 is the thicker portion of the symmetric air foil shape.

Likewise, the aft mast 314 defines chord 402. The aft mast 316 in the illustrated embodiments has a cross-section of a symmetric air foil, with the symmetry being about the chord 402. For the aft mast 316, the leading edge of the mast 316 is the thinner portion of the symmetric air foil shape. As illustrated, in a particular embodiment the chord 400 defined by the forward mast 314 is parallel to the chord 402 defined by the aft mast 316, and more particularly the chords 400 and 402 and co-linear; however, embodiments where the chords 400 and 402 are parallel, but not co-linear, are also contemplated. As mentioned above, the masts, particularly the aft mast 316, may act as a rudder to provide directional stabilization to the tail buoy.

In other cases, the cross-sectional shape of the masts may take any suitable form, such as rectangular, oblong, or circular. In other embodiments, one mast may have the symmetric air foil shape (e.g., the aft mast), and to the other mast have a different cross-sectional shape.

FIG. 4 does not necessarily speak to the internal components of the masts at the water level. In some cases, the masts may be solid structures. In yet still other case, the masts may be constructed of a resilient exterior material (e.g., plastic, fiber glass, composite material) and define a hollow interior. In yet still other cases, the masts may be filled with a closed cell buoyancy foam to provide buoyancy, yet also reduce water intrusion in the even of a breach of the mast material.

Figure 5:
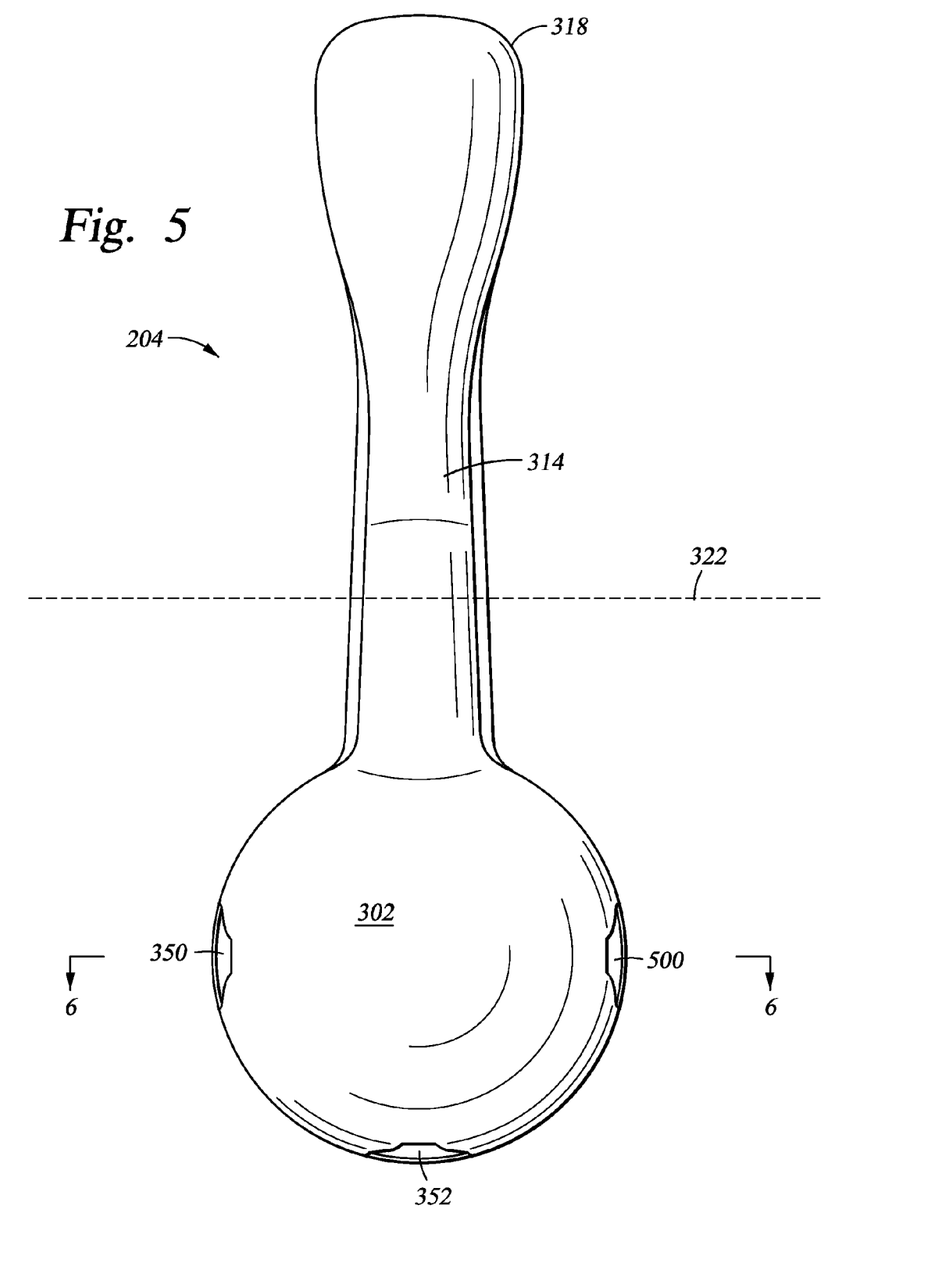
FIG. 5 shows a front elevation view of a buoy in accordance with at least some embodiments.

FIG. 5 shows a front elevation view of the tail buoy 204 in accordance with at least some embodiments. In particular, FIG. 5 shows the forward portion 302, along with the forward mast 314, the spanning portion 318, and the expected steady-state water level 322. FIG. 5 also shows the scoop 350, and a better view of lower scoop 352. As illustrated, lower scoop 352 resides proximate to the forward portion 302 at a first circumferential location opposite the forward mast 314. The side scoop 350 is disposed proximate to the forward portion at a second circumferential location between the forward mast 314 and the lower scoop 352. Likewise, a second side scoop 500 is disposed proximate to the forward portion at a third circumferential location opposite the circumferential location of the side scoop 350. The respective circumferential locations of the scoops 350, 352, and 500, and the number of scoops, may be different in equivalent embodiments. For example, four scoops may be used, with each scoop at a circumferential location 90 degrees of arc from the next scoop (and with the forward mast 314 bisecting the circumferential space between two scoops.

FIG. 5 also shows that, in a particular embodiment, the upper portion of the front mast 314 and/or the spanning portion 318 may widen relative to other portions of the forward mast 314 and/or spanning portion 318. The widened portion may be to expand the area of the solar panel disposed on the spanning portion 318 (the solar panel not visible in FIG. 5). The widened portion may also provide additional buoyancy to help right the buoy in the event the buoy rotates such that the masts and spanning portion are fully or partially submerged (e.g., to pass under floating debris or other survey equipment).

Figure 6:
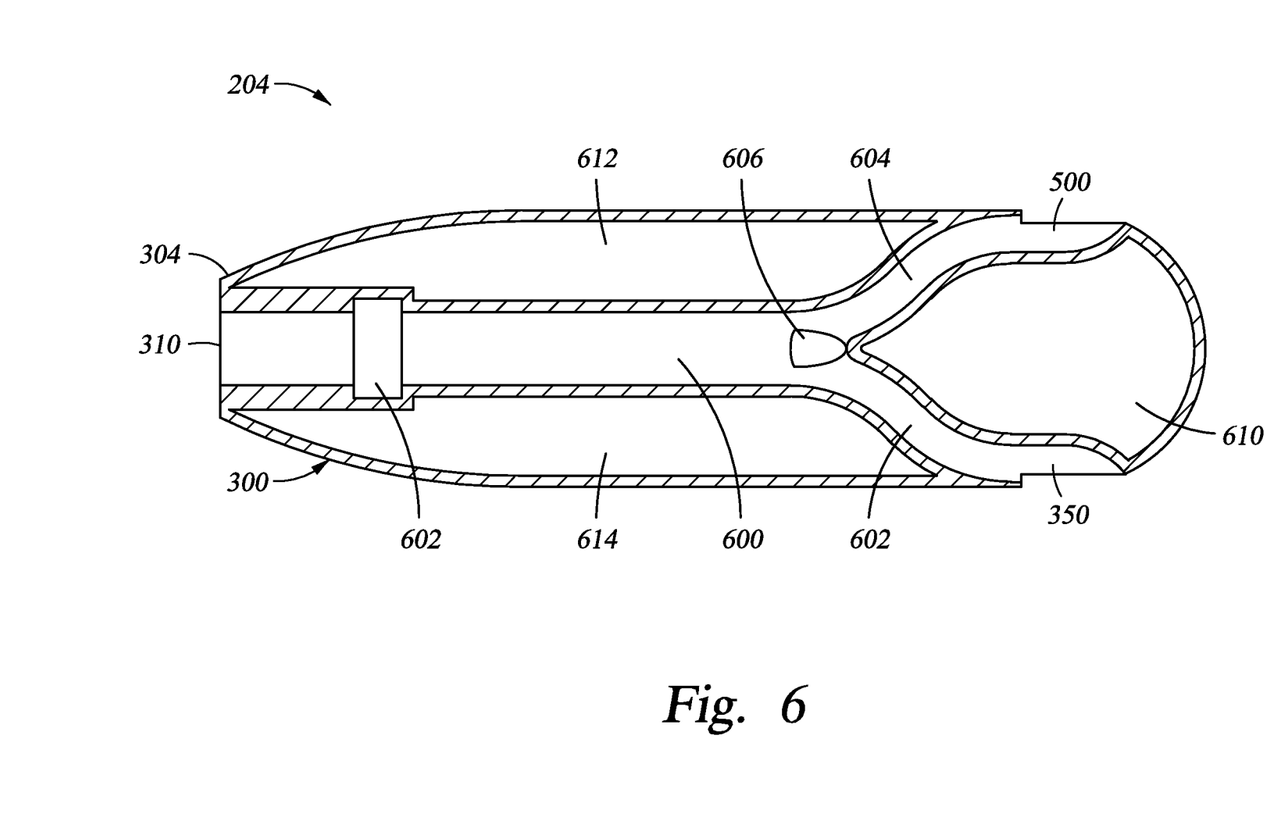
FIG. 6 shows a cross-sectional view of the buoy taken substantially along lines 6-6 of FIG. 5, and in accordance with at least some embodiments.

FIG. 6 shows a cross-sectional view of the elongated main body of the buoy 204 taken substantially along lines 6-6 of FIG. 5. In particular, FIG. 6 illustrates an internal fluid channel 600, as well as an electrical generator 602. In accordance with the various embodiments, each scoop, such as scoops 350 and 500, are fluidly coupled to an internal fluid channel 600. In the illustrative embodiments of FIG. 6, scoop 350 has an intermediate channel 602 that fluidly couples the scoop 350 the internal fluid channel 600. Likewise, scoop 500 has an intermediate channel 604 that fluidly couples the scoop 500 the internal fluid channel 600. Though the lower scoop 352 is not visible in FIG. 6, the lower scoop 352 likewise has an intermediate channel 606 that is fluidly coupled to the internal fluid channel 600. In the illustrated embodiments, the internal fluid channel 600 runs within the elongated main body 300 and discharges through the aperture 310.

In an embodiment, the scoops and water flow through the internal fluid channel 600 caused by the scoops may act to help stabilize the direction of travel. In other embodiments, the water flow through the internal channel may be used to generate electrical energy. For example, in an embodiment an electrical generator 602 is disposed in operational relationship to the internal fluid channel 600. The illustrative electrical generator 602 is show disposed near the aft portion 304; however, the electrical generator may be disposed in any suitable location within the elongated main body 300, such as a location that helps setting the steady state floatation characteristics. In embodiments that use an electrical generator, the water flow through the channel turns the generator thus producing electrically energy. The electrical energy may be used to power electrical devices associated with the buoy 204, such as the lights 334, GPS system, and/or radio communication system. The electrical generator may take any suitable form, such as a "ring" generator available from TSL Technology Ltd of Hampshire, England.

Before proceeding, a few points are in order regarding FIG. 6. In particular, the cross-sectional view of FIG. 6 seems to imply separate chambers 610, 612, and 614 within the elongated main body 300; however, in some embodiments the intermediate channels and internal fluid channel do not segregate the internal volume into distinct chambers. For example, chamber 612 and chamber 614 may be the same chamber. In other cases, bulkheads within the elongated main body may separate the chambers. Moreover, FIG. 6 shall not be read to imply anything about the further internal structure of the elongated main body 300. In some cases, the internal volume may be filled with a closed-cell foam, or left empty, to provide buoyancy. Moreover, some or all the chambers within the elongated main body 300 may contain ballast to provide the steady-state floatation characteristics discussed above. The ballast may be permanently or semi-permanently installed ballast (e.g., metallic ballast material), or the ballast may be by way of flooding portions of the internal volume of the elongated main body 300 with sea water (i.e., ballast tanks).

Figure 7:
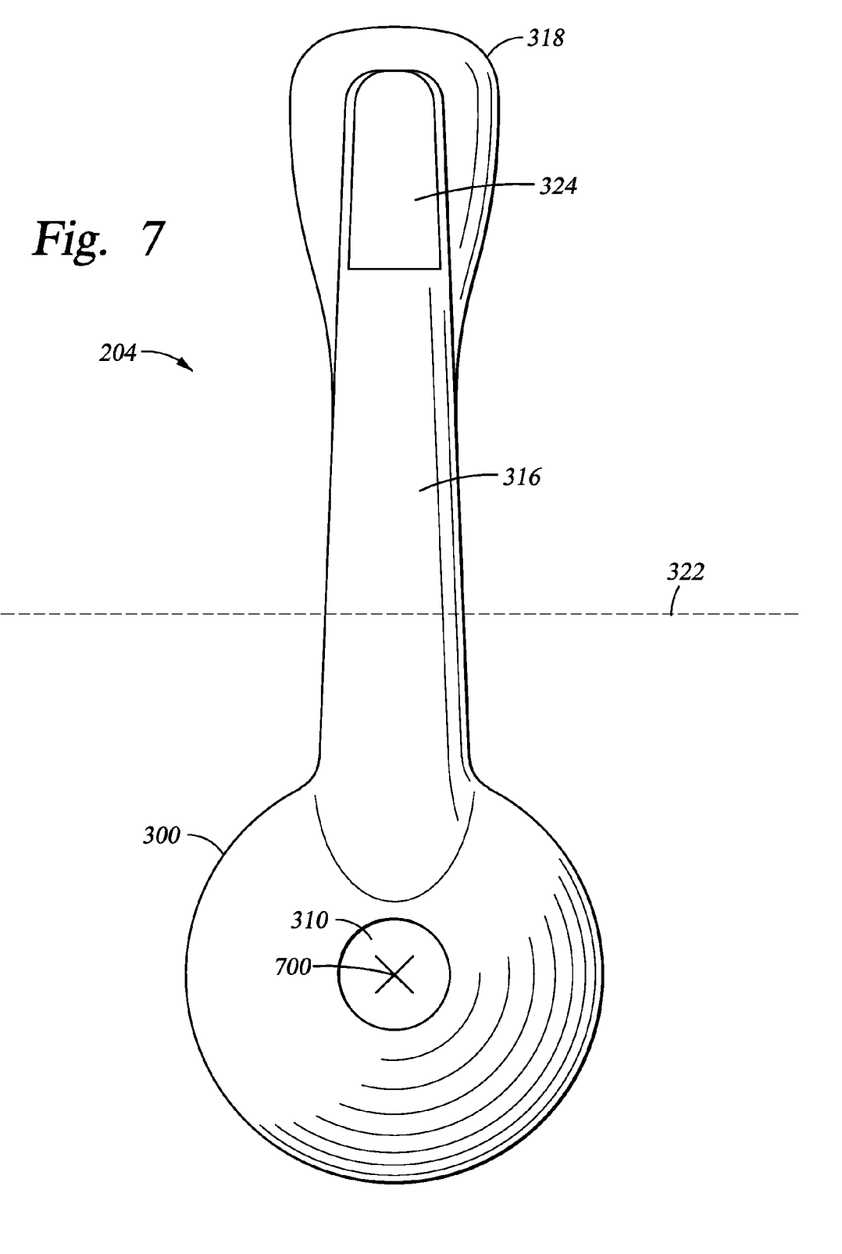
FIG. 7 shows a back elevation view of a buoy in accordance with at least some embodiments.

Finally, FIG. 7 shows a rear elevation view of the tail buoy 204 in accordance with at least some embodiments. In particular, FIG. 7 shows the aft portion 304, aperture 310, aft mast 316, and the electrical enclosure 324. Also visible behind the electrical enclosure 324 is the spanning portion 318. As illustrated, the aperture 310 in accordance with at least some embodiments is centered along the long axis 310 of the elongated main body 300. In view of FIG. 7, the long axis is perpendicular to the page, and is illustrated by symbol 700. In the particular embodiment of FIG. 7, the aft mast 316 extends to contact the tapered aft portion 304; however, in other cases the aft mast 316 may couple to the elongated main body more forward of the tapered aft portion 304. Electrical enclosure 324 is disposed at the distal end of the aft mast 316, above the expected water level 322. In a particular embodiment, some or all of the electrical equipment is disposed within the electrical enclosure 324, not only to keep the electrical equipment above the water level to reduce the likelihood of water encroachment, but also to simplify maintenance. That is, in some embodiments the electrical enclosure may be removed and replaced as an integrated unit.

In accordance with a particular embodiment, the tail buoy is constructed of relatively lightweight moldable material, such as plastic, fiberglass, carbon composite material, or some combination. In one case, the entire buoy is constructed of mirrored halves coupled together along a continuous seam. In other cases, the material of the elongated main body 300, front mast 314, aft mast 316, and spanning portion 318 may be of different materials. Moreover, the elongated main body 300, and mast system 312 (or any portion thereof), may be separately constructed and coupled together by any suitable method. In the event the tail buoy is constructed such that internal flooding is possible (i.e., hollow internal cavities), an emergency floatation bag system may incorporated with the tail buoy at any suitable location such that even if damaged the tail buoy will not be lost.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A buoy comprising:
an elongated main body configured to be towed through water and having a forward portion and an aft portion;
a mast system coupled to the elongated main body, the mast system comprising:

a forward mast extending from the elongated main body and coupled proximate to the forward portion, the forward mast defining a first chord;

an aft mast extending from the elongated main body and coupled proximate to the aft portion, the aft mast defining a second chord parallel to the first chord;

a spanning portion coupled between a distal end of the forward mast and a distal end of the aft mast; and an aperture defined at least in part by the main body, forward mast, aft mast, and spanning portion;

wherein the buoy is configured to float in water such that the water level intersects the forward mast and aft mast, the elongated body is submerged, and the spanning portion is disposed above the water level.

2. The buoy of claim 1 wherein the elongated main body further comprises:

a first scoop disposed proximate to the forward portion, the first scoop fluidly coupled to an internal fluid channel;

an outlet aperture disposed at the aft portion, the outlet aperture fluidly coupled to the internal fluid channel; and an electrical generator within the elongated main body and in operational relationship to the internal fluid channel, the electrical generator configured to generate electrical energy responsive to fluid flow through the internal channel.

3. The buoy of claim 2:

wherein the first scoop is disposed proximate to the forward portion at a first circumferential location opposite the forward mast; and further comprising:

a second scoop disposed proximate to the forward portion at a second circumferential location between the first circumferential location and the forward mast, the second scoop fluidly coupled to the internal fluid channel; and a third scoop disposed proximate to the forward portion at a third circumferential location opposite the second circumferential location, the third scoop fluidly coupled to the internal fluid channel.

4. The buoy of claim 1 wherein the aft portion further comprises a taper narrowing toward the aft end of the buoy.

5. The buoy of claim 1 wherein the forward portion further comprises a profile that has parabolic shape.

6. The buoy of claim 1 wherein the aft mast has a cross-sectional shape of an air foil symmetric about the second chord.

7. The buoy of claim 1 wherein the forward mast has a cross-sectional shape of an air foil symmetric about the first chord.

8. The buoy of claim 1 further comprising a global position system (GPS) antenna coupled to the mast system above an expected water level.

9. The buoy of claim 1 further comprising a solar panel coupled to the mast system above an expected water level.

10. The buoy of claim 1 further comprising a light coupled to the mast system, the light disposed within the aperture.

11. A buoy system comprising:

means for providing buoyancy when the buoy is partially submerged;

means for providing directional stabilization, the means for providing directional stabilization configured to extend above an expected water level; and means for directing water flow through an internal channel of the means for providing buoyancy.

12. The buoy system of claim 11 wherein the means for providing buoyancy further comprises a means for providing ballast disposed within the means for providing buoyancy.

13. The buoy system of claim 11 wherein the means for providing directional stabilization further comprises:

means for limiting yaw of the means for providing buoyancy, the means for limiting yaw coupled proximate to an aft portion of the means for providing buoyancy; and means for deflecting objects, the means for deflecting coupled between a distal end of the means for limiting yaw and a forward portion of the means for providing buoyancy.

14. The buoy of claim 11 further comprising means for determining location of the buoy, the means for determining coupled to the means for providing directional stabilization, and the means for determining disposed above the expected water level.

15. The buoy of claim 11 further comprising means for collecting energy from the sun, the means for collecting coupled to the means for providing directional stabilization, and the means for collecting disposed above the expected water level.

16. The buoy of claim 11 wherein the means for providing directional stabilization further comprises a cross-sectional shape of an airfoil symmetric about a chord.

17. A marine survey system comprising:

a survey vessel;

a plurality of sensor streamers coupled to the survey vessel by at least one line, each sensor streamer defining a proximal portion closest to the survey vessel, and a distal portion;

a plurality of sensors associated with each of the plurality of sensor streamers;

a plurality of tail buoys coupled one each to the distal portion of each of the plurality of sensor streamers, each tail buoy comprising:

an elongated main body having a forward portion and an aft portion;

a mast system coupled to the elongated main body, the mast system comprising:

a forward mast extending from the elongated main body and coupled proximate to the forward portion, the forward mast defining a first chord;

an aft mast extending from the elongated main body and coupled proximate to the aft portion, the aft mast defining a second chord parallel to the first chord;

a spanning portion coupled between a distal end of the forward mast and a distal end of the aft mast; and an aperture defined at least in part by the main body, forward mast, aft mast, and spanning portion;

wherein each tail buoy is configured to float in water such that the water level intersects the forward mast and aft mast, the elongated body is submerged, and the spanning portion is disposed above the water level.

18. The marine survey system of claim 17 wherein each elongated main body of the plurality of tail buoys further comprises:

a first scoop disposed proximate to the forward portion, the first scoop fluidly coupled to an internal fluid channel;

an outlet aperture disposed at the aft portion, the outlet aperture fluidly coupled to the internal fluid channel; and an electrical generator within the elongated main body and in operational relationship to the internal fluid channel, the electrical generator configured to generate electrical energy responsive to fluid flow through the internal channel.

19. The marine survey system of claim 18:

wherein the first scoop is disposed proximate to the forward portion at a first circumferential location opposite the forward mast; and further comprising:

a second scoop disposed proximate to the forward portion at a second circumferential location between the first circumferential location and the forward mast, the second scoop fluidly coupled to the internal fluid channel; and a third scoop disposed proximate to the forward portion at a third circumferential location opposite the second circumferential location, the third scoop fluidly coupled to the internal fluid channel.

20. The marine survey system of claim 17 wherein each tail buoy of the plurality of tail buoys further comprises at least one selected from the group consisting of: a taper narrowing toward the aft end of the tail buoy; a profile of the forward portion that has parabolic shape; a cross-sectional shape of the aft mast of an air foil symmetric about the second chord; and a cross-sectional shape of the forward mast of an air foil symmetric about the first chord.

* * * * *